United States Patent
Zakowski et al.

(10) Patent No.: US 10,695,935 B2
(45) Date of Patent: Jun. 30, 2020

(54) SLICING DISC ASSEMBLY FOR FOOD PROCESSOR

(71) Applicant: CONAIR CORPORATION, Stamford, CT (US)

(72) Inventors: Joseph W. Zakowski, New Canaan, CT (US); Kam Fai Fung, Tuen Mun (HK)

(73) Assignee: CONAIR CORPORATION, Stamford, CT (US)

( * ) Notice: Subject to any disclaimer, the term of this patent is extended or adjusted under 35 U.S.C. 154(b) by 737 days.

(21) Appl. No.: 15/234,115

(22) Filed: Aug. 11, 2016

(65) Prior Publication Data
US 2018/0043564 A1 Feb. 15, 2018

(51) Int. Cl.
| | |
|---|---|
| *B26D 7/26* | (2006.01) |
| *A47J 43/046* | (2006.01) |
| *A47J 43/07* | (2006.01) |
| *A47J 43/08* | (2006.01) |
| *B26D 1/29* | (2006.01) |
| *B26D 7/00* | (2006.01) |

(52) U.S. Cl.
CPC .......... *B26D 7/2628* (2013.01); *A47J 43/046* (2013.01); *A47J 43/0722* (2013.01); *A47J 43/085* (2013.01); *B26D 1/29* (2013.01); *B26D 7/2614* (2013.01); *B26D 2007/0018* (2013.01); *B26D 2210/02* (2013.01)

(58) Field of Classification Search
CPC ..... A47J 43/046; B26D 7/2628; B26D 3/283; B26D 3/11; B26D 7/2614; B26D 2210/02
USPC .................................................. 83/672, 680
See application file for complete search history.

(56) References Cited

U.S. PATENT DOCUMENTS

| | | | | |
|---|---|---|---|---|
| 97,047 | A * | 11/1869 | Chrysier | A23N 4/04 99/552 |
| 3,799,023 | A * | 3/1974 | Brignard | B02C 18/08 83/663 |
| 4,393,737 | A * | 7/1983 | Shibata | B26D 3/22 241/282.2 |
| 4,542,857 | A | 9/1985 | Akasaka | |
| 4,644,838 | A * | 2/1987 | Samson | B26D 7/06 83/162 |
| 4,704,959 | A * | 11/1987 | Scallen | B26D 3/22 83/356.3 |
| 4,744,522 | A * | 5/1988 | Borgmann | A47J 19/023 241/92 |
| 4,852,441 | A * | 8/1989 | Anders | B26D 1/29 83/155 |
| 4,877,191 | A | 10/1989 | Golob et al. | |
| 4,926,726 | A * | 5/1990 | Julian | B26D 3/11 408/111 |

(Continued)

*Primary Examiner* — Sean M Michalski
(74) *Attorney, Agent, or Firm* — Grogan, Tuccillo & Vanderleeden, LLP

(57) ABSTRACT

A slicing disc assembly includes a work bowl, a driving shaft standing upwardly from the bottom of the work bowl, a gearbox base removably locked onto the work bowl, a gearbox cover affixed onto the gearbox base and thereby forms a housing, a gear rotatably disposed in the housing, and a spiral blade operatively disposed onto the gear. The gear is planetarily rotated via the engagement between gear teeth and the driving shaft, while the spiral blade rotates simultaneously and maintains relative same position with the gear during its operation.

9 Claims, 23 Drawing Sheets

(56) References Cited

U.S. PATENT DOCUMENTS

| | | | | |
|---|---|---|---|---|
| 5,042,342 A * | 8/1991 | Julian | | B26D 1/29 83/402 |
| 5,168,784 A * | 12/1992 | Foster | | B26D 3/11 83/24 |
| 5,343,791 A * | 9/1994 | Julian | | B26D 1/29 83/402 |
| 5,852,968 A | 12/1998 | Sundquist | | |
| 5,992,287 A * | 11/1999 | Dube | | B26D 3/11 241/282.2 |
| 6,018,876 A * | 2/2000 | Hodges | | B26B 3/04 30/278 |
| 6,035,771 A * | 3/2000 | Conran | | A47J 43/082 241/199.12 |
| 6,748,853 B1 | 6/2004 | Brady et al. | | |
| 6,814,323 B2 | 11/2004 | Starr et al. | | |
| 6,845,932 B2 * | 1/2005 | Ruttimann | | B26D 1/29 241/296 |
| 7,159,808 B2 | 1/2007 | Starr | | |
| 8,146,490 B2 | 4/2012 | Obersteiner et al. | | |
| 8,215,231 B2 | 7/2012 | Bigge et al. | | |
| 8,262,005 B2 | 9/2012 | Garcia | | |
| 8,474,739 B2 * | 7/2013 | Ruola | | B02C 7/12 241/261.2 |
| 8,602,335 B2 | 12/2013 | Krasznai | | |
| 8,671,832 B2 | 3/2014 | Beber et al. | | |
| 8,943,854 B2 | 2/2015 | Persson | | |
| 9,089,987 B2 * | 7/2015 | Walker | | B26D 1/28 |
| 9,352,479 B2 * | 5/2016 | Walker | | B26D 1/0006 |
| 2004/0056130 A1 * | 3/2004 | Gursel | | A47J 43/0722 241/282.1 |
| 2007/0252024 A1 | 11/2007 | Barraclough | | |
| 2011/0265664 A1 * | 11/2011 | Goncalves | | A47J 43/0716 99/538 |
| 2012/0024125 A1 * | 2/2012 | Walker | | B26D 1/29 83/402 |
| 2012/0090480 A1 * | 4/2012 | Caspar | | B26D 3/11 99/537 |
| 2012/0103149 A1 * | 5/2012 | Rexwinkle, Jr. | | B26D 3/11 82/1.11 |
| 2013/0233952 A1 | 9/2013 | Pryor, Jr. et al. | | |
| 2014/0061344 A1 * | 3/2014 | Conti | | A47J 43/0722 241/100 |
| 2016/0046031 A1 * | 2/2016 | Rogers | | B26D 3/11 83/672 |
| 2016/0101533 A1 * | 4/2016 | Aramburo | | B26D 3/11 241/101.4 |
| 2016/0250768 A1 * | 9/2016 | Levine | | B26D 3/11 83/52 |
| 2017/0080588 A1 * | 3/2017 | Bagley | | B26D 3/26 |
| 2017/0311761 A1 * | 11/2017 | Obersteiner | | A47J 43/046 |
| 2018/0028011 A1 * | 2/2018 | Cheung | | A47J 9/002 |
| 2018/0264674 A1 * | 9/2018 | Bagley | | B26D 3/283 |
| 2018/0338643 A1 * | 11/2018 | Hammond | | A47J 43/085 |
| 2018/0353014 A1 * | 12/2018 | Antkowiak | | A47J 43/0722 |
| 2019/0134835 A1 * | 5/2019 | Fung | | B26D 1/43 |

* cited by examiner

SLICING DISC ASSEMBLY FOR FOOD PROCESSOR

FIELD OF THE INVENTION

The present invention relates generally to a slicing disc assembly and more particularly, to a slicing disc assembly in association with a food processor.

BACKGROUND OF THE INVENTION

As is known in the art, a food processor is used for preparing food. The function of a typical food processor, depending on the arrangement of its working attachment such as blade, includes slicing, grinding, mixing, shredding, and the like.

Existing food processors typically include a base in which a motor is enclosed. A shaft driven by the motor protrudes into a bowl or a cup arranged on top or next to the base. An attachment such as a cutting blade is coupled to and driven by the shaft. Preparing the food is often accomplished by activation of the motor, which drives the attachment via the shaft, hence processing the food.

While existing food processors are generally suitable for what is regarded as ordinary performance, there is room for improvement in terms of ease of use, compactness, and performance, including efficient contact and control between the shaft and the attachments, as well as easier and safer handling of the attachments.

SUMMARY OF THE INVENTION

It is an object of the present invention to provide a slicing disc assembly.

It is an object of the present invention to provide a slicing disc assembly in association with a food processor.

It is an object of the present invention to provide a slicing disc assembly having more efficient contact with the driving shaft.

It is an object of the present invention to provide a slicing disc assembly having a blade that is safe for handling.

It is an object of the present invention to provide a slicing disc assembly that can be placed in a variety of positions on top of a work bowl.

According to an embodiment of the present invention, a slicing disc assembly of the present invention includes a gear compartment forming by a gearbox base and a gearbox cover, a gear disposed within the gear compartment, and a spiral blade removably disposed on top of the gear.

DETAILED DESCRIPTION OF THE PREFERRED EMBODIMENTS

Figure 1:
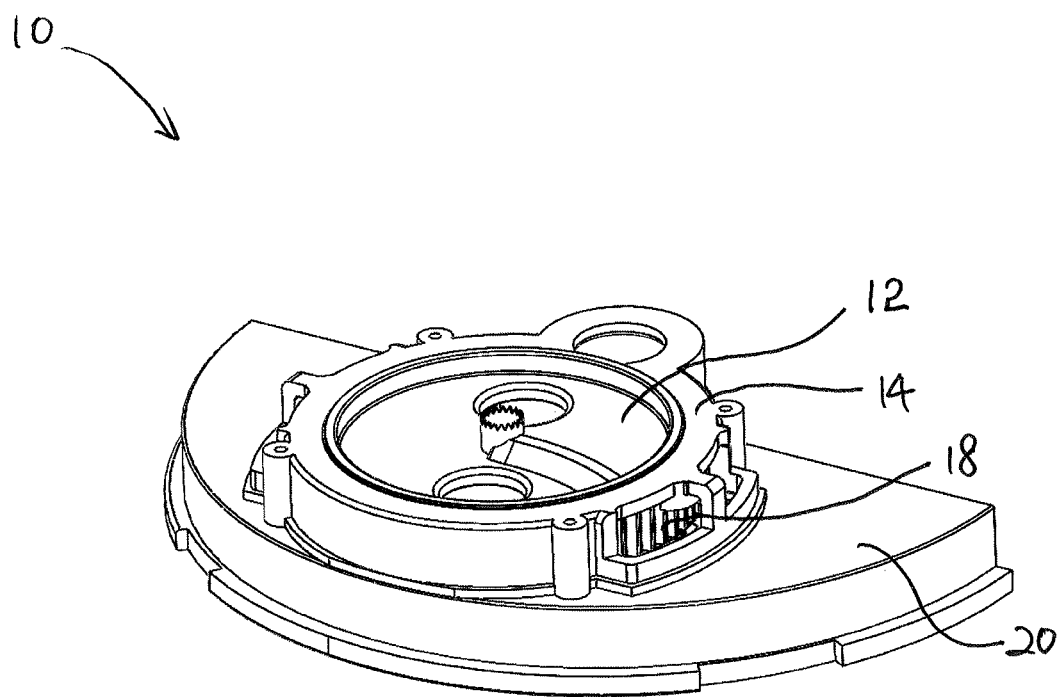
FIG. 1 is an isomeric view of a slicing disc assembly in accordance with an embodiment of the present invention.
Figure 2:
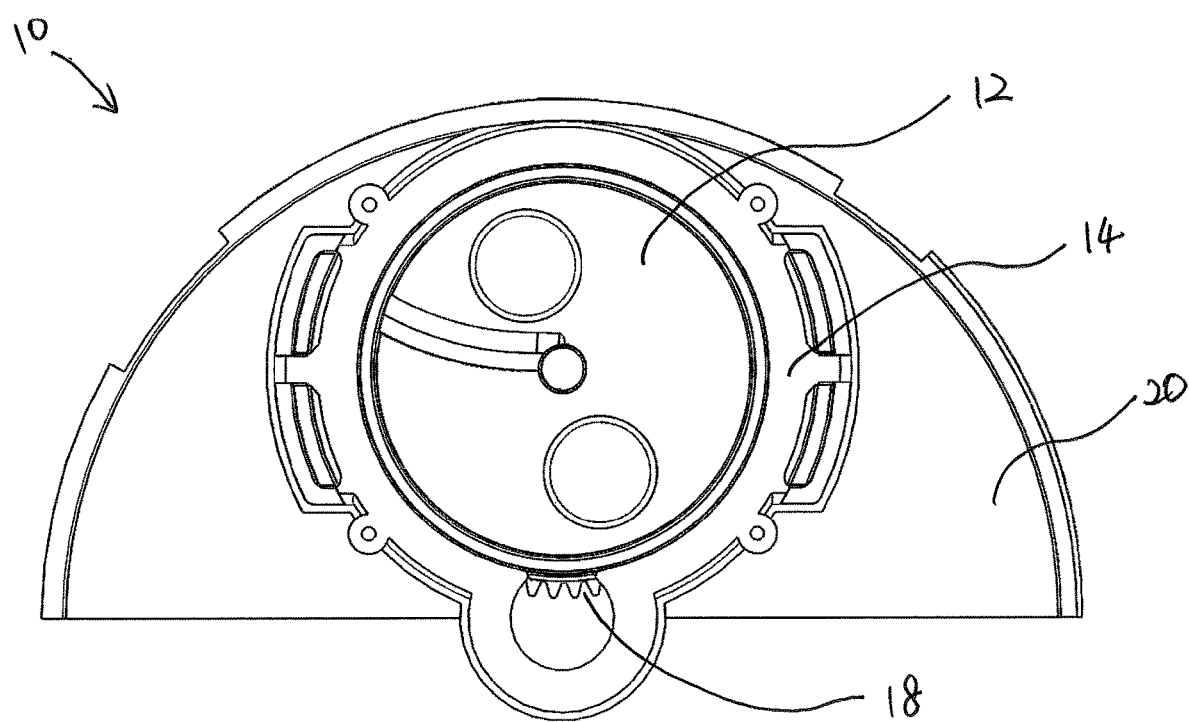
FIG. 2 is a top elevational view of a slicing disc assembly in accordance with an embodiment of the present invention.
Figure 3:
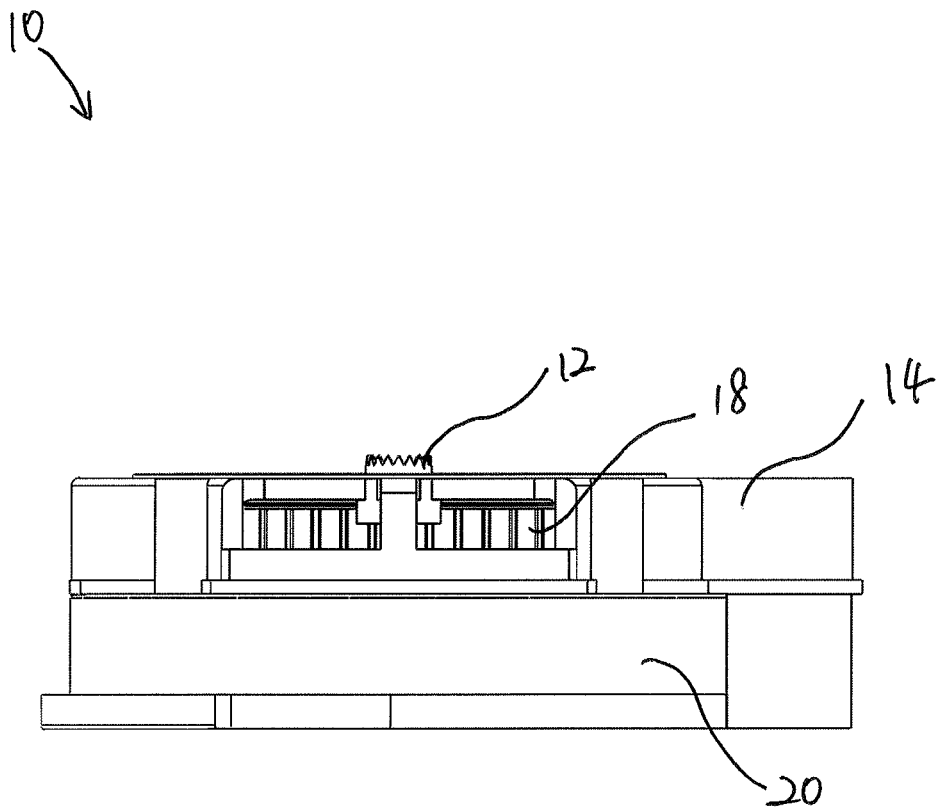
FIG. 3 is a side elevational view of a slicing disc assembly in accordance with an embodiment of the present invention.

Referring to FIG. 1-4, a slicing disc assembly 10 for a food processor is shown. The slicing disc assembly includes a gearbox base 20 which can be operatively disposed onto the lip of a work bowl 100. A gearbox cover 14 is affixed onto the top of the gearbox base 20 by any type of fastening means generally know in the art. A compartment is therefore formed by and between the gearbox base 20 and gearbox cover 14. In an embodiment, a gear 18 is disposed in the compartment. In one embodiment, two bushing rings 16 are disposed in the same compartment, with one arranged on top of the gear 18 and the other one is arranged below the gear 18. Both bushing rings 16 are in direct contact with the gear 18. A spiral blade 12 is rotatably disposed on top of the gear 18 and the gearbox cover 14.

Figure 5:
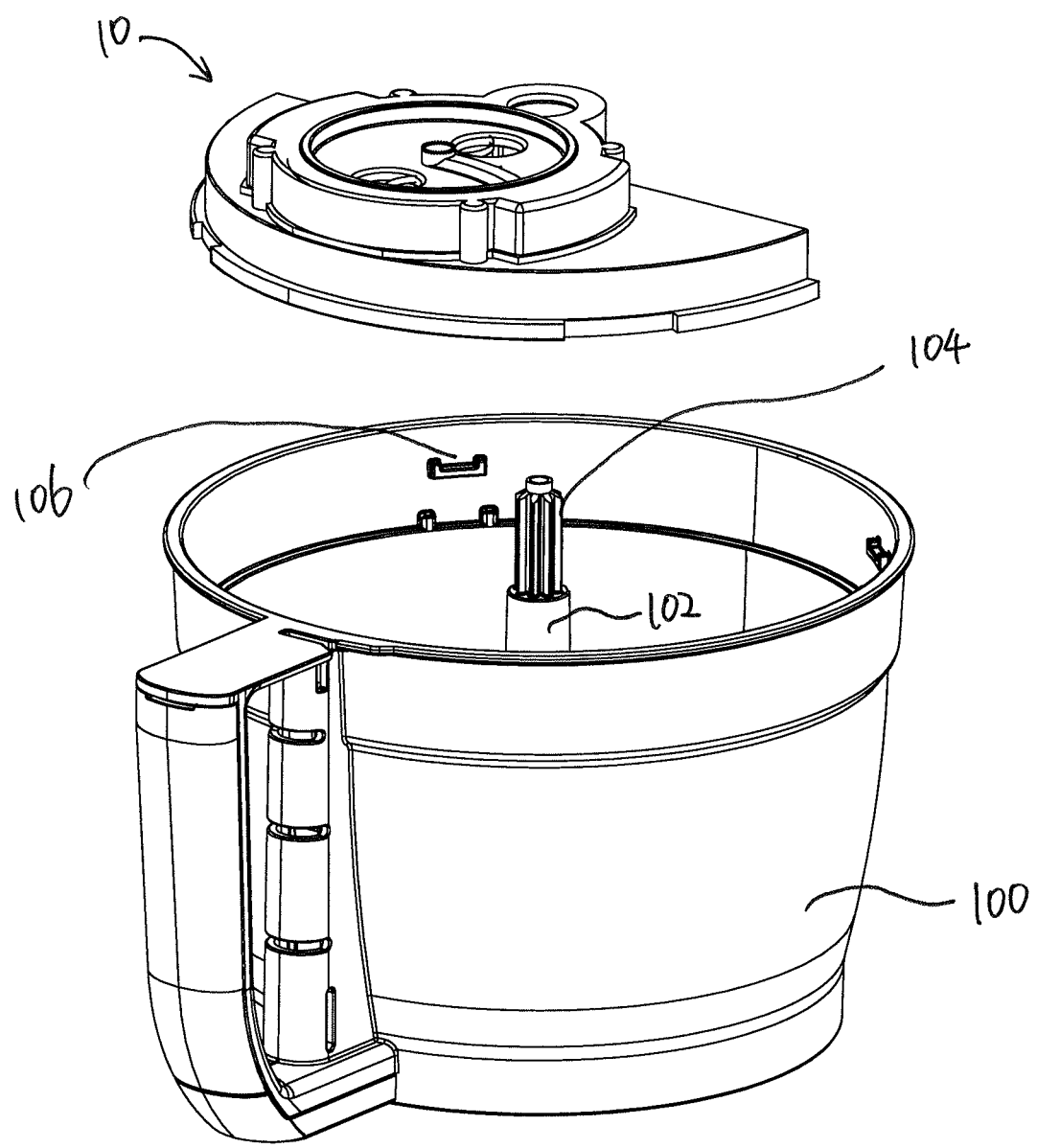
FIG. 5 illustrates the slicing disc assembly, the work bowl, and the driving shaft.

As shown in FIG. 5, the slicing disc assembly 10 is engaged with a driving shaft 102, which is driven by a motor (not shown). In one embodiment, the driving shaft vertically extends into the chamber of a work bowl 100. The upper end 104 of the driving shaft 102 protrudes from the gearbox base 20 and gearbox cover 14 and is complimentary keyed to mate with teeth on the gear 18, and thereby rotates the gear 18 upon the activation of the motor.

Figure 6:
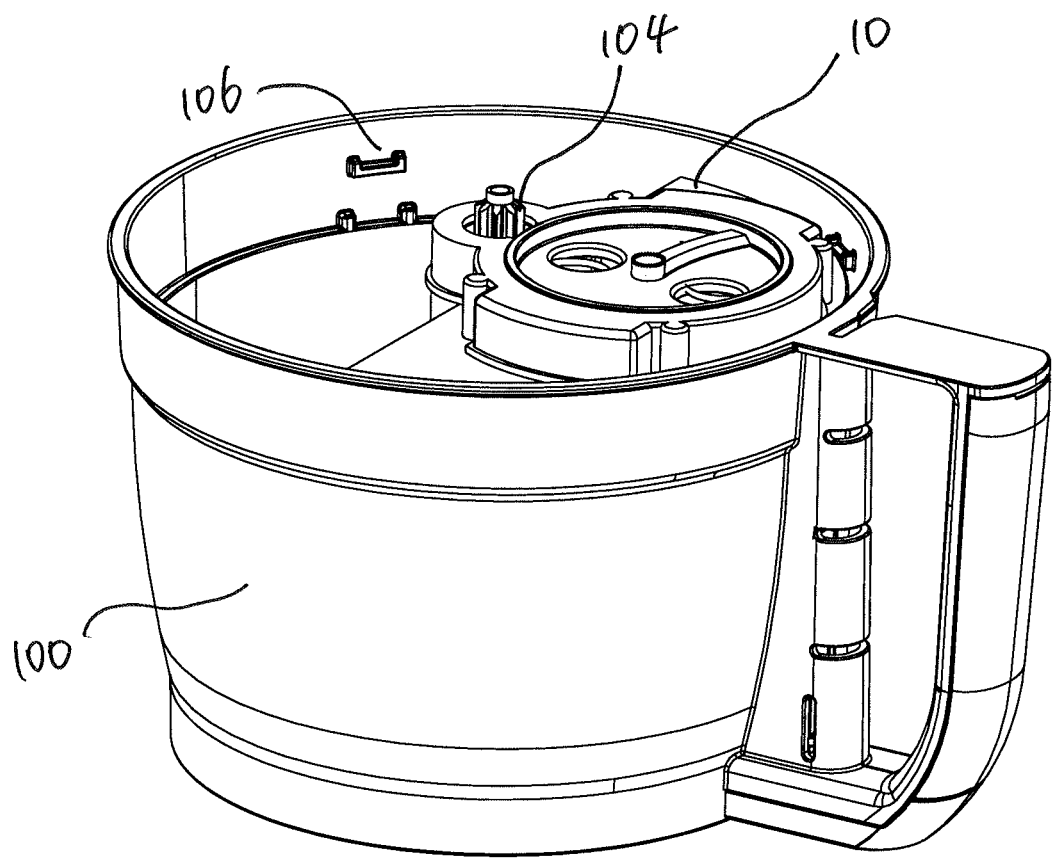
FIG. 6 illustrates an isometric view of a slicing disc assembly deposited on top of a work bowl and matched with a driving shaft via the gear.
Figure 7:
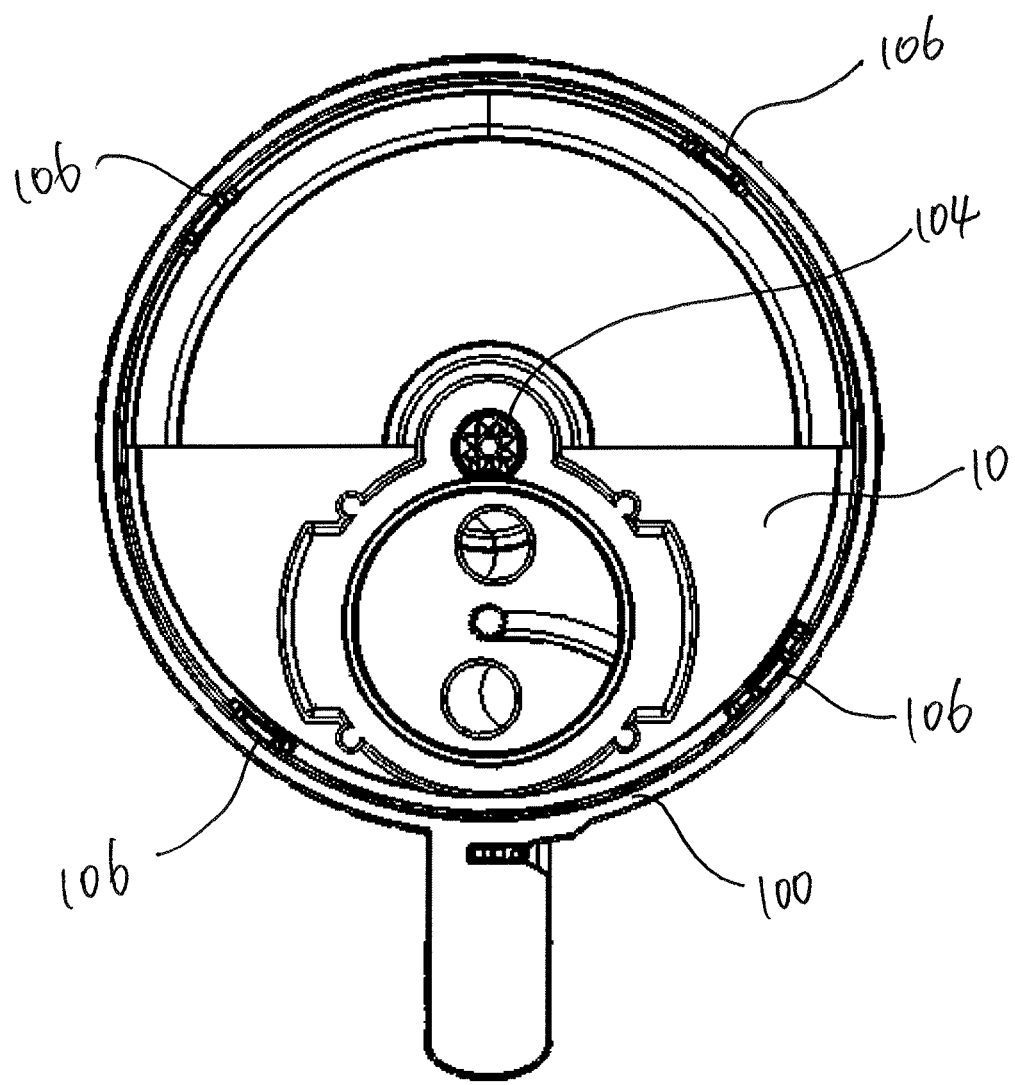
FIG. 7 illustrates a top elevational view of a slicing disc assembly deposited on top of a work bowl and matched with a driving shaft via the gear.

The inner wall of the lip of the work bowl 100 has one or more snapping means 106 that is generally known in the art for locking the slicing disc assembly 10 onto the lip of the work bowl 100. The number and position of the snapping means 106 are designed to permit the slicing disc assembly 10 to be located and locked in more than one position in the work bowl 100. In one embodiment, as shown in FIGS. 6 and 7, four snapping means are evenly distributed around the circumference of the lip of the work bowl 100. Each of the two adjacent snapping means 106 is complementary mated to the two corresponding keyways 2004 on the slicing disc assembly 10. Therefore, there are four different positions on which the slicing disc assembly 10 can be disposed onto the work bowl 100.

Figure 8:
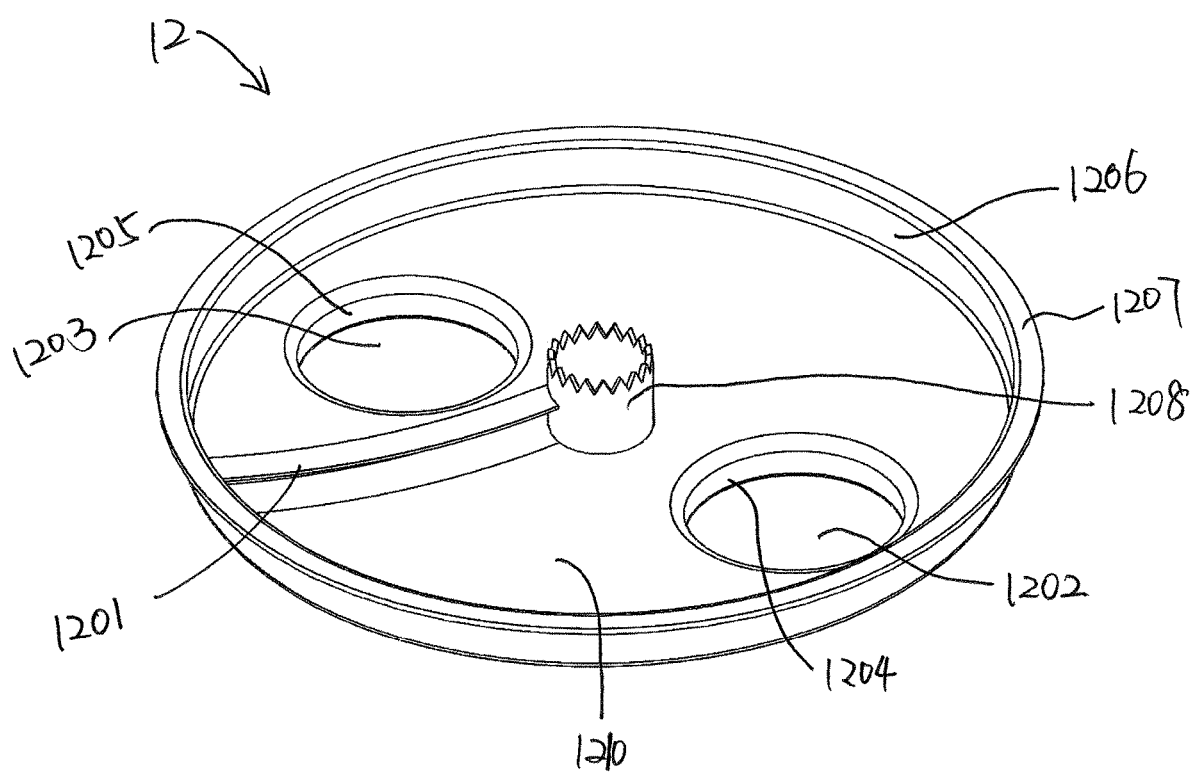
FIG. 8 is an isometric view of a spiral blade in accordance with an embodiment of the present invention.
Figure 9:
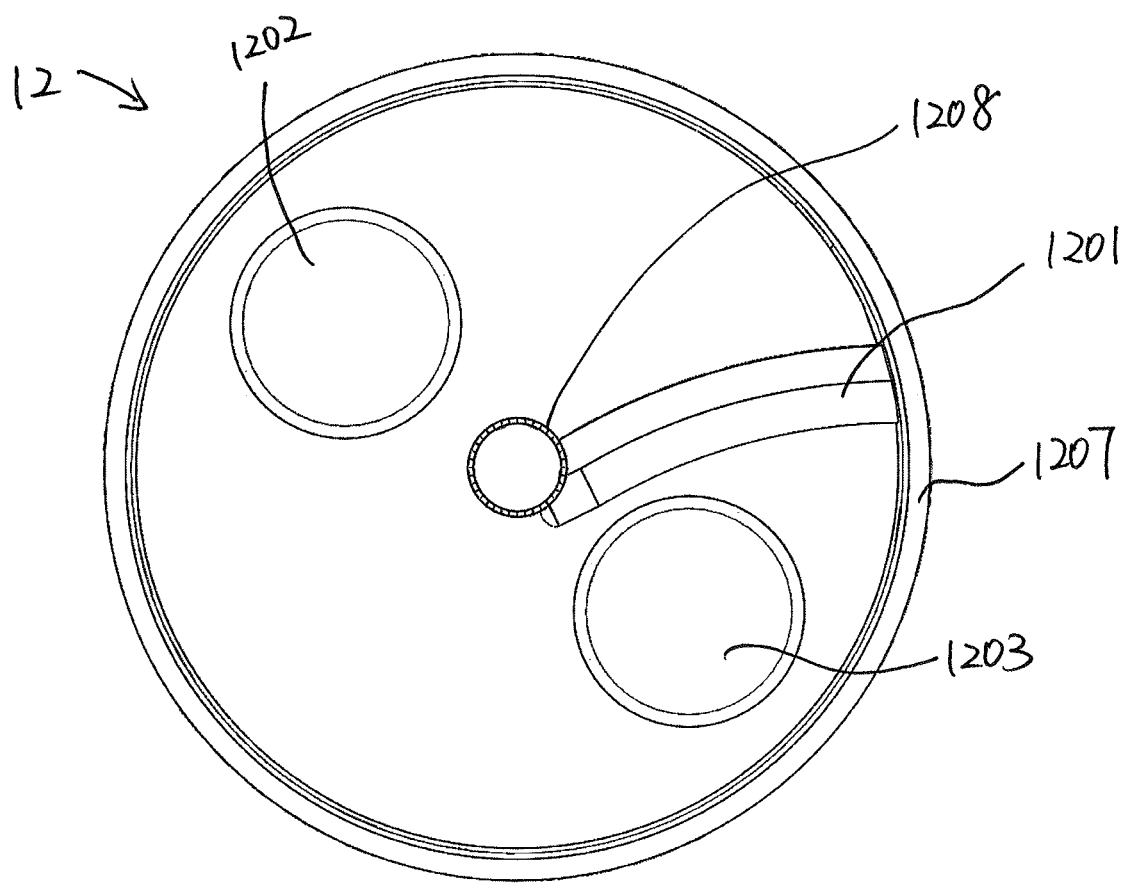
FIG. 9 is a top elevational view of a spiral blade in accordance with an embodiment of the present invention.
Figure 10:
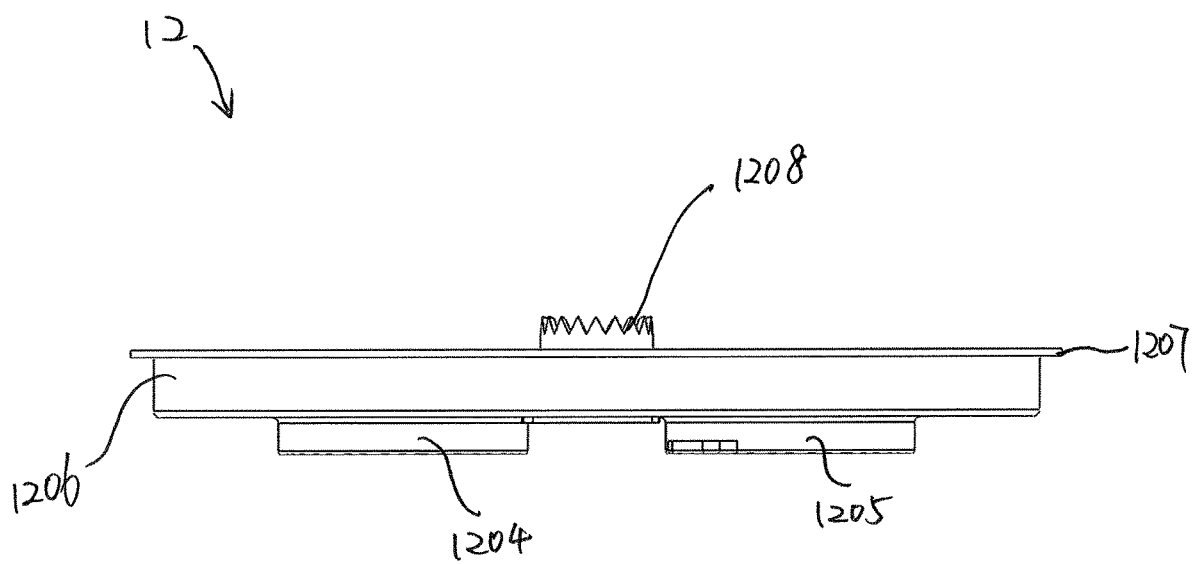
FIG. 10 is a side elevational view of a spiral blade in accordance with an embodiment of the present invention.

Referring to FIGS. 8-10, the spiral blade 12 includes a disc body 1210, a peripheral wall 1206, and a disc upper edge 1207. A central portion 1208 is located in the center of the disc body 1207. Two blade holding openings 1202 and 1203 are carried by the disc body 1210. Each of the blade holding openings 1202 and 1203 has a mating key ring, 1204 and 1205 respectively, extending downwardly from the disc body 1210. A blade 1201 is integrated in the disc body 1210, with one end extending to the central portion 1208, and the other end extending to the peripheral wall 1206.

Figure 17:
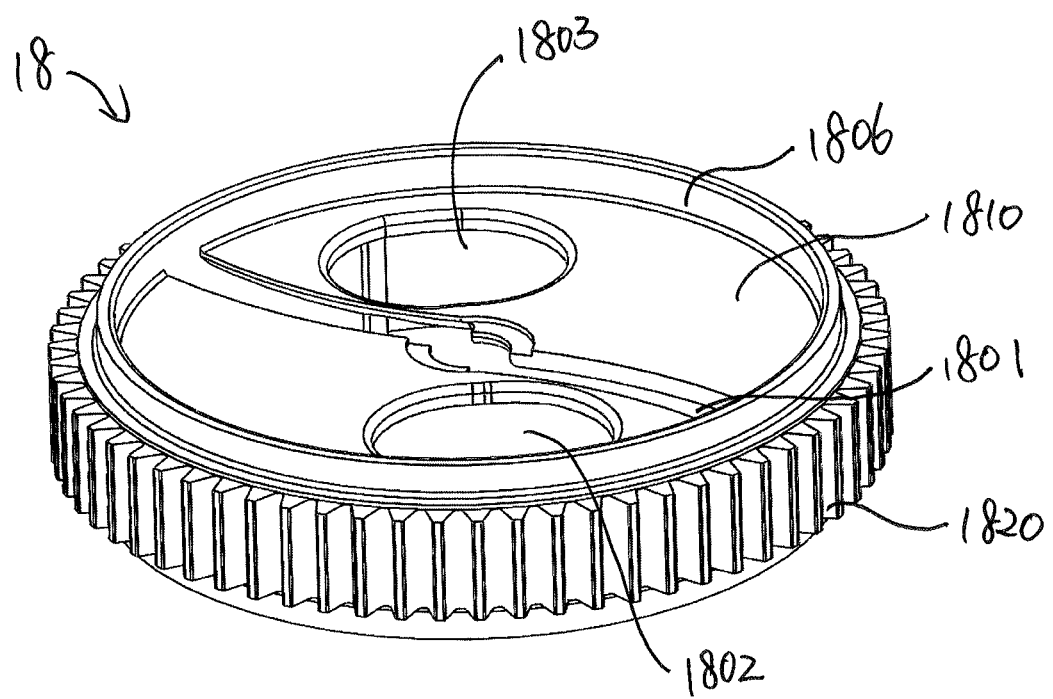
FIG. 17 is an isometric view of a gear in accordance with an embodiment of the present invention.
Figure 18:
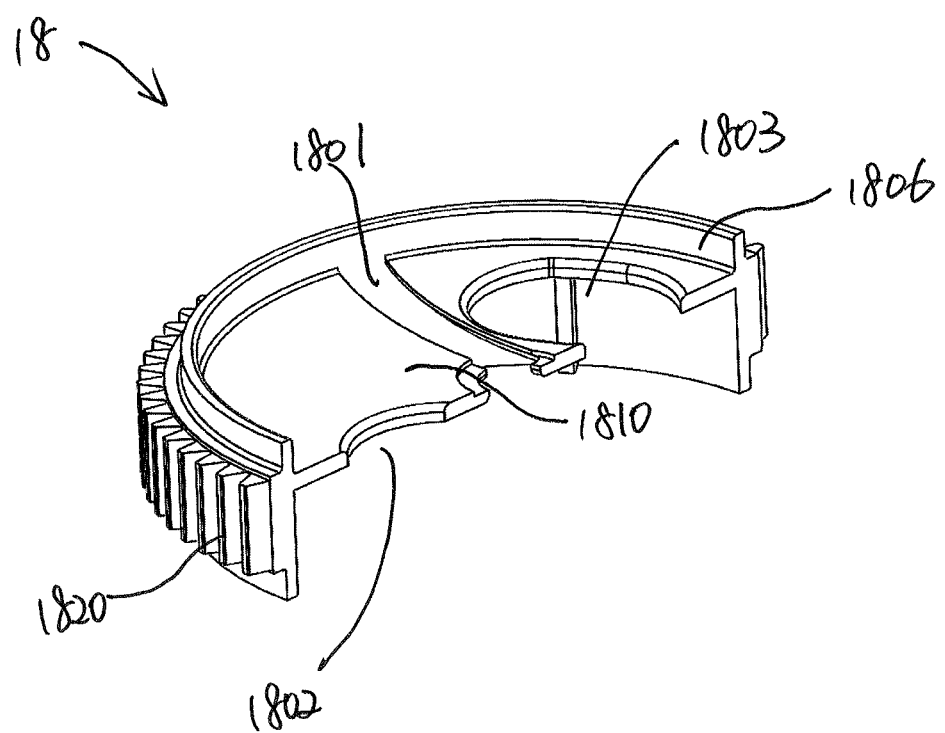
FIG. 18 is a sectional view of a gear in accordance with an embodiment of the present invention.
Figure 19:
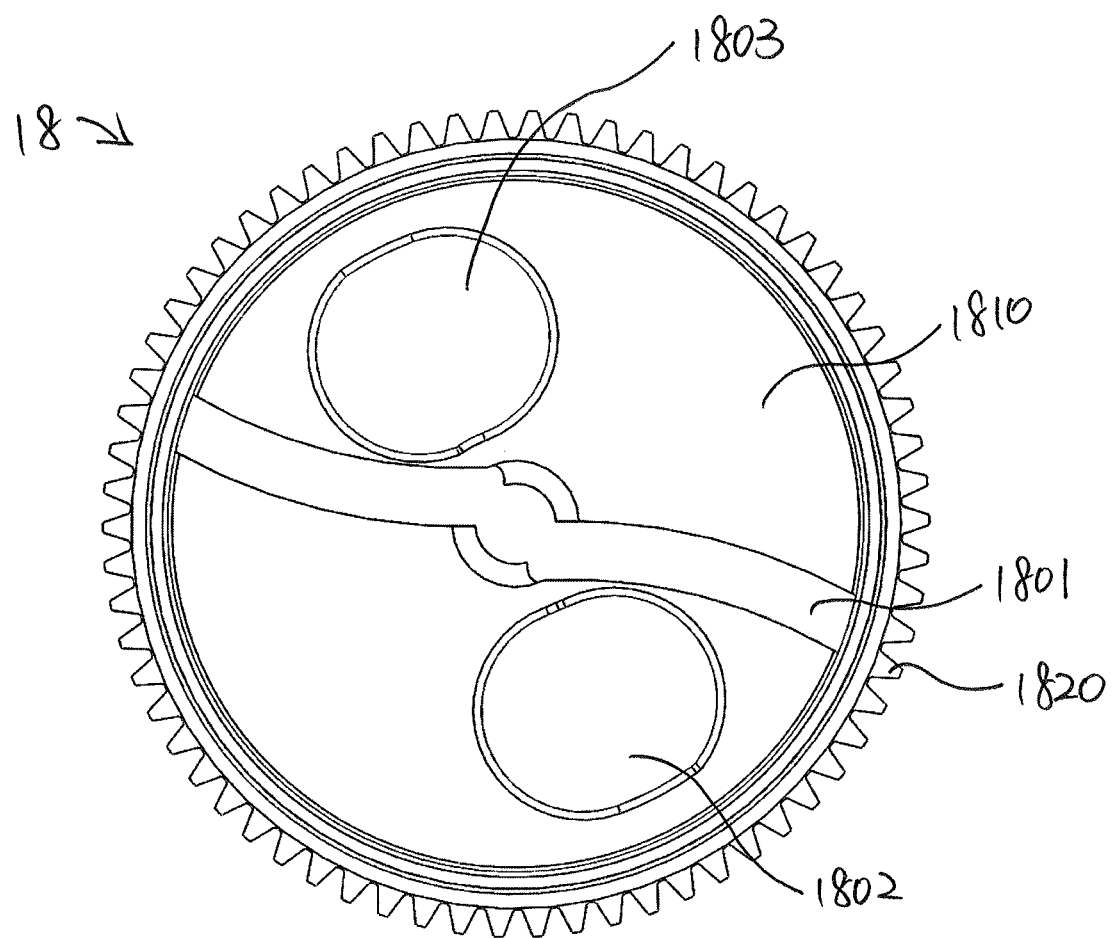
FIG. 19 is a top elevational view of a gear in accordance with an embodiment of the present invention.
Figure 20:
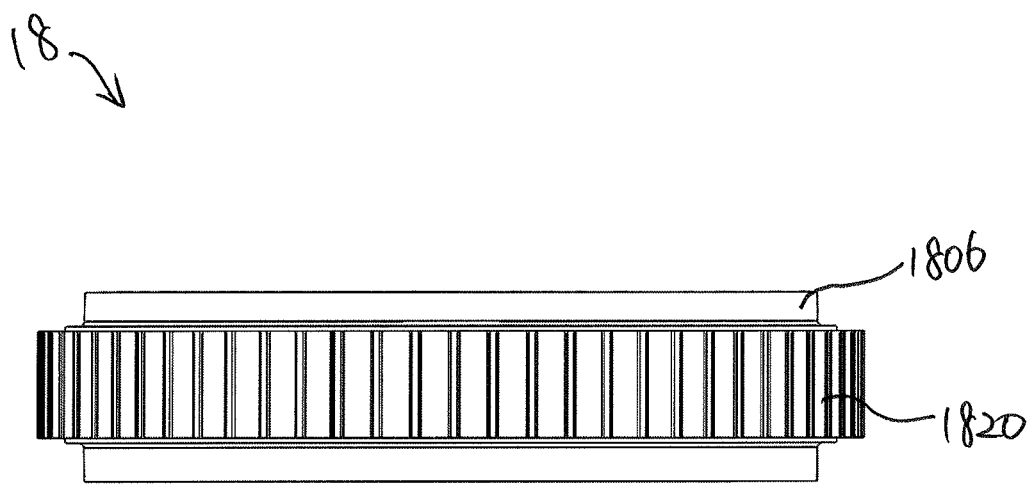
FIG. 20 is a side elevational view of a gear in accordance with an embodiment of the present invention.

The two blade holding openings 1202 and 1203 are used by the user for handling the spiral blade 12. When the spiral blade 12 is disposed onto the gear 18, each of the mating key rings 1204 and 1205 is complimentary mated with the gear holding openings 1802 and 1803 of the gear 18, respectively, as shown in FIG. 17. The spiral blade 12 and the gear 18 then, when driven by the driving shaft 102, rotate at the same speed and maintain the relative same position. When the spiral blade need to be removed, the user can hold the spiral blade 12 via the blade holding openings 1202 and 1203 and lift the spiral blade 12 up from the gear 18. Hence, with such two openings, the user of the blade disc assembly can replace the spiral blade without touching the blade 1201 itself, and thereby is prevented from injured by the blade 1201.

Figure 11:
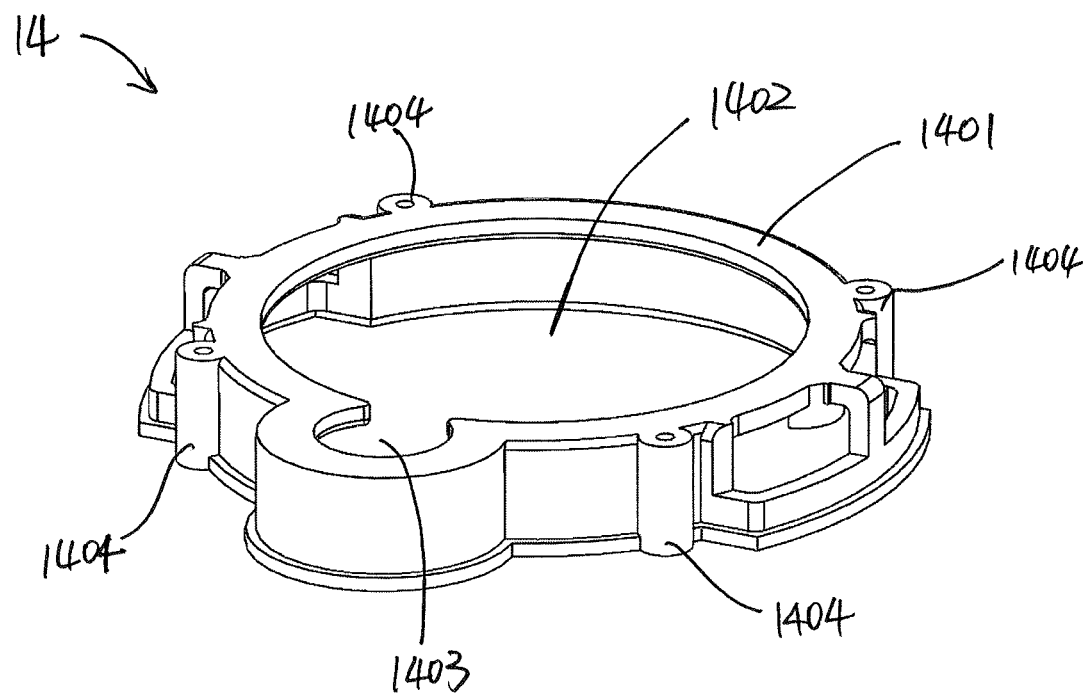
FIG. 11 is an isometric view of a gearbox cover in accordance with an embodiment of the present invention.
Figure 12:
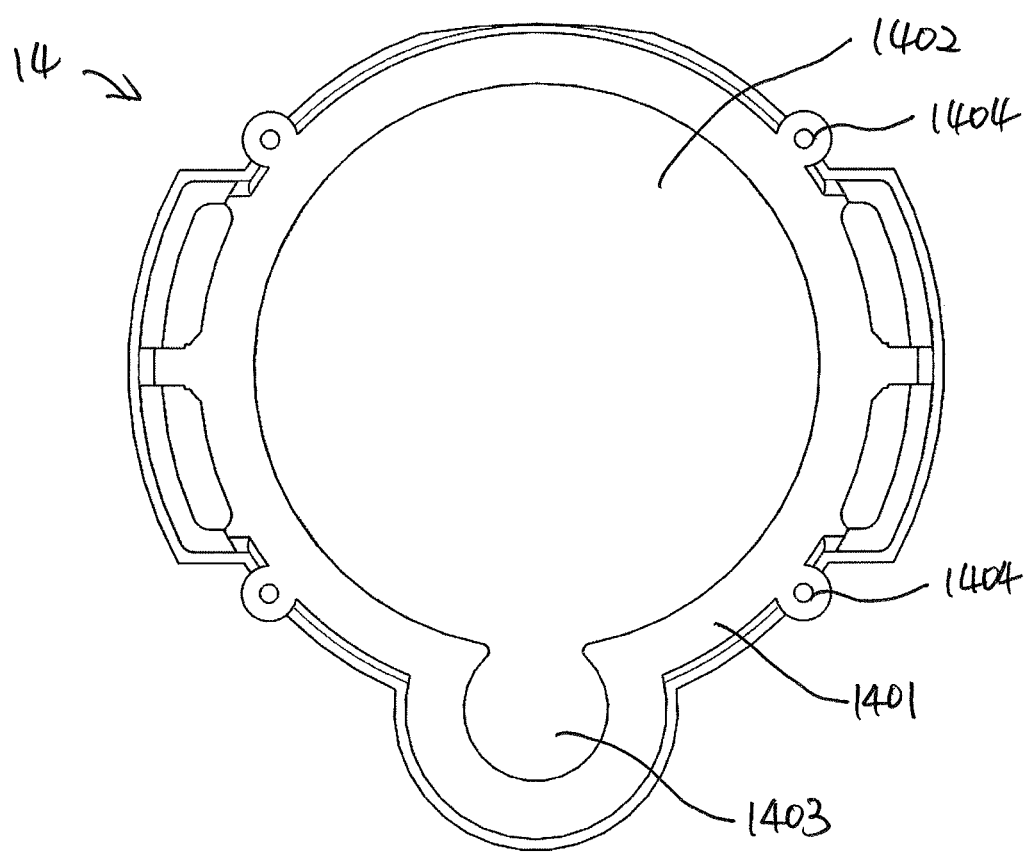
FIG. 12 is a top elevational view of a gearbox cover in accordance with an embodiment of the present invention.
Figure 13:
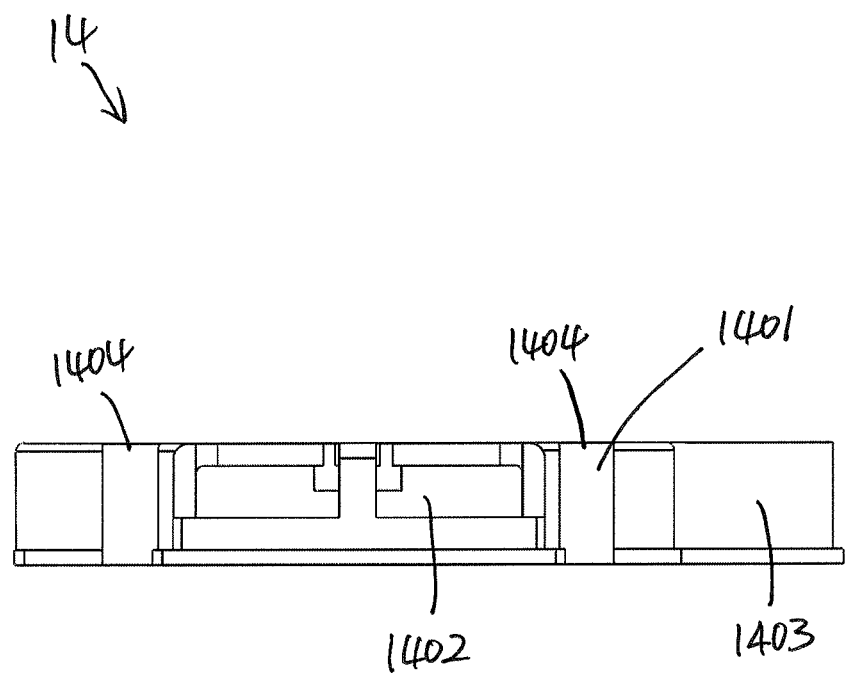
FIG. 13 is a side elevational view of a gearbox cover in accordance with an embodiment of the present invention.

The gearbox cover 14 is shown in FIG. 11-13. The gearbox cover includes a cover frame 1401 and four fastener receivers 1404. The cover frame 1401 forms two compartments 1402 and 1403. The gear compartment 1403 receives the gear 18, while the shaft compartment 1402 receives the upper end 104 of the driving shaft 102.

Figure 4:
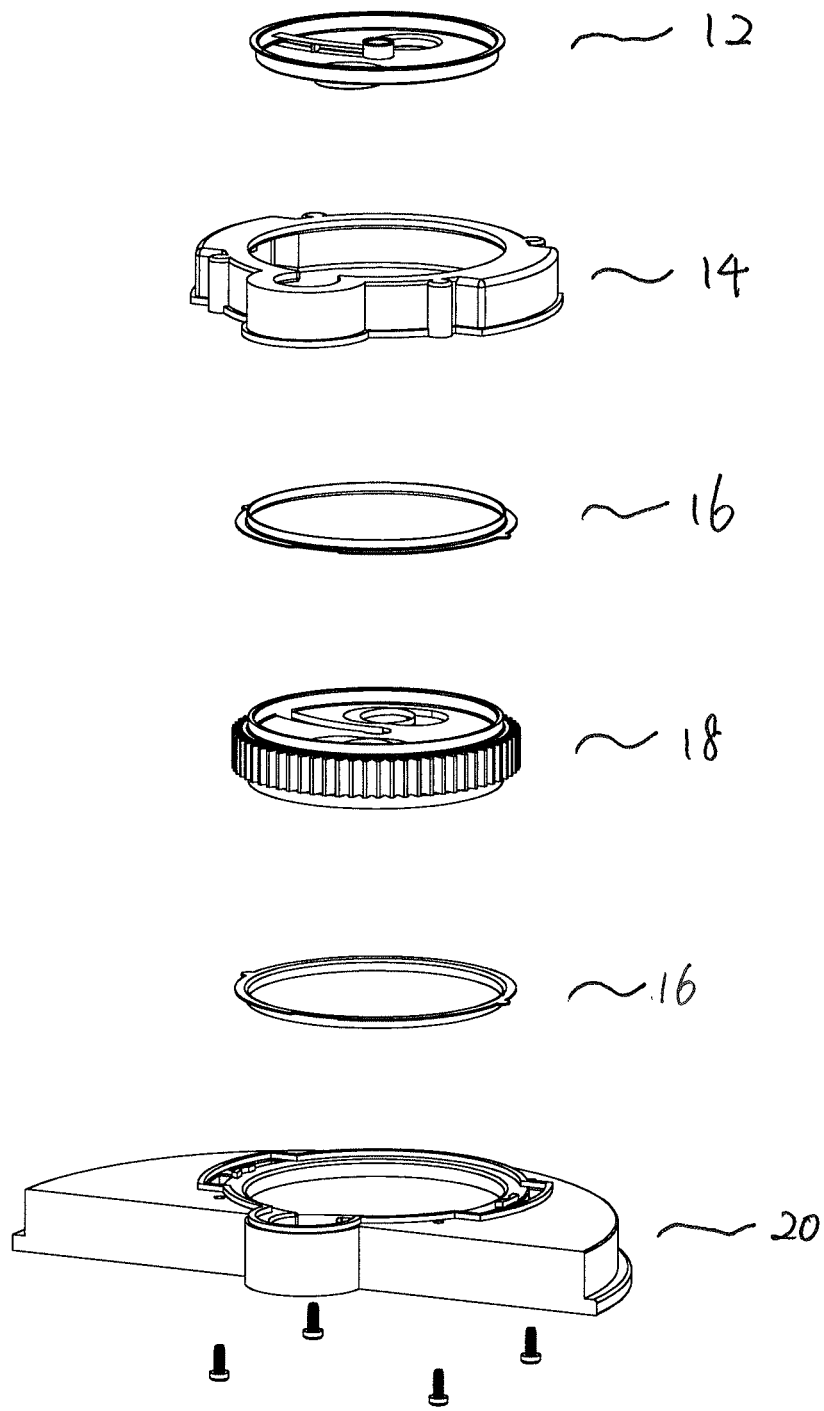
FIG. 4 is an exploded view of a slicing disc assembly in accordance with an embodiment of the present invention.
Figure 14:
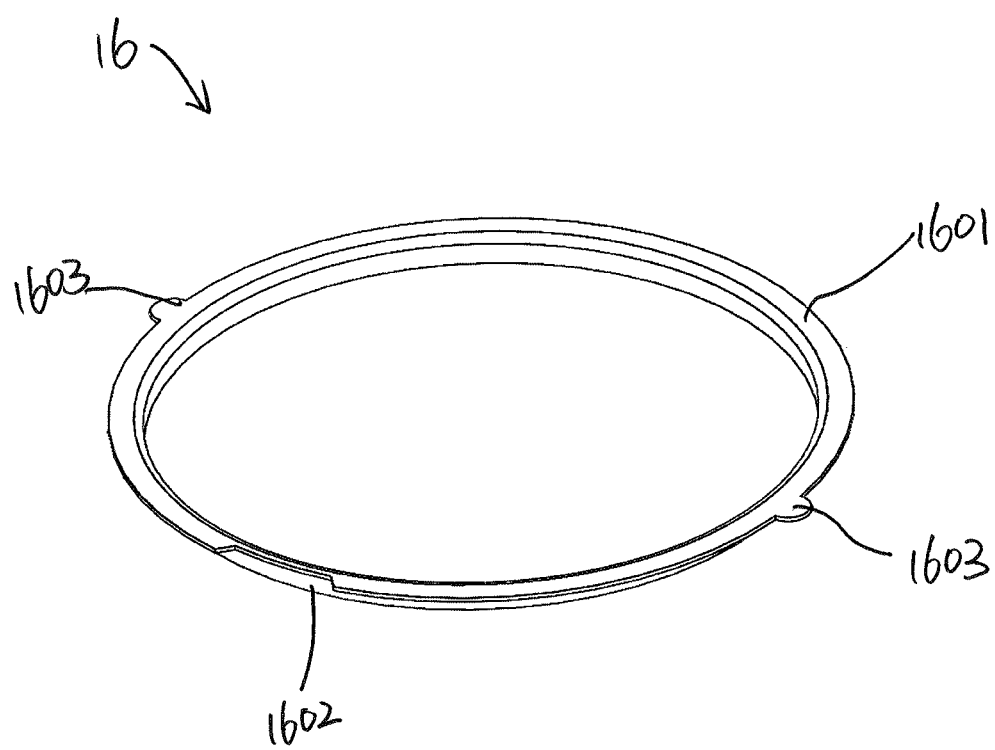
FIG. 14 is an isometric view of a bushing ring in accordance with an embodiment of the present invention.
Figure 15:
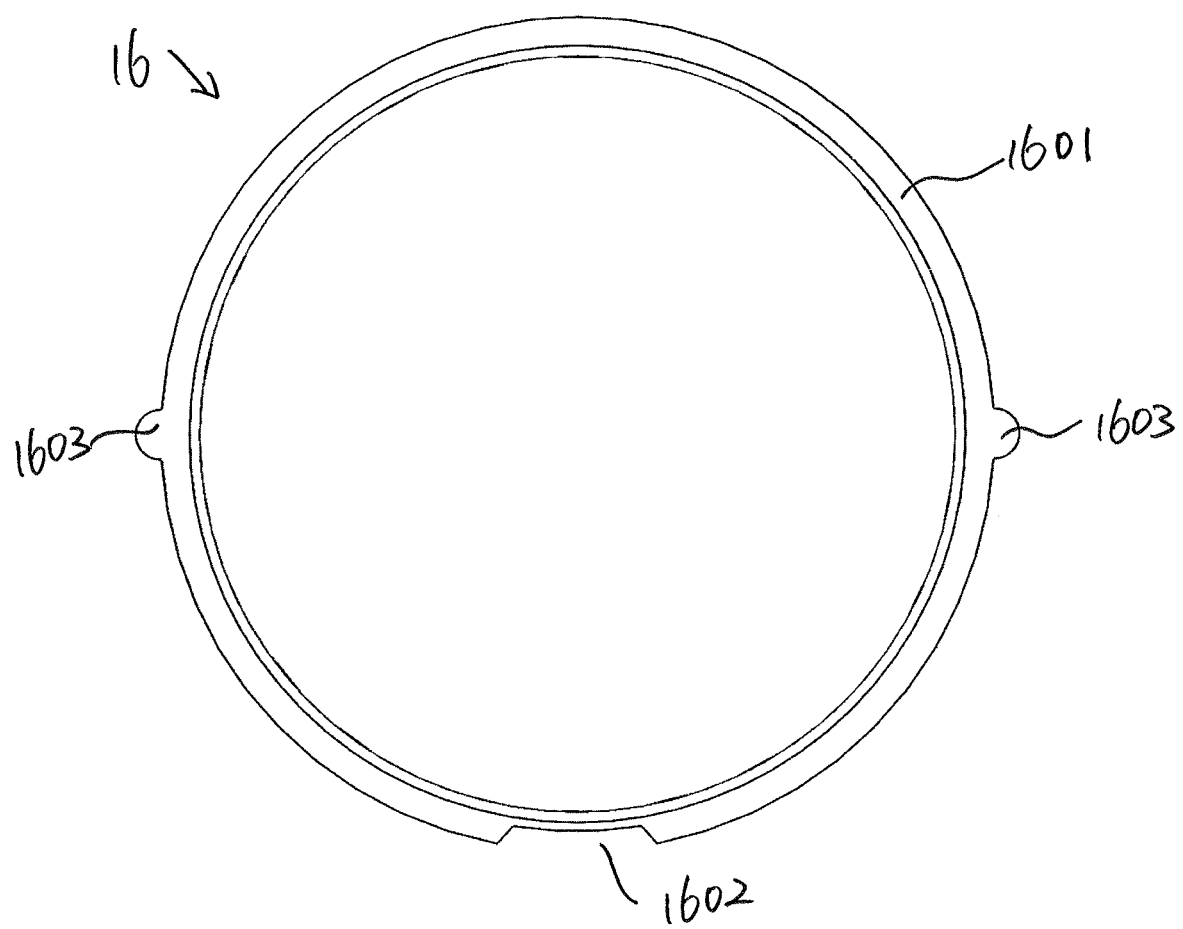
FIG. 15 is a top elevational view of a bushing ring in accordance with an embodiment of the present invention.
Figure 16:
FIG. 16 is a side elevational view of a bushing ring in accordance with an embodiment of the present invention.

FIG. 14-16 illustrate the bushing ring 16 having a denture opening 1602 and a pair of opposed ears 1603. In the slicing disc assembly 10, two bushing rings 16 are disposed opposite to each other, with one on top of the gear 18 and the one under the gear 18, as shown in FIG. 4. The denture opening 1602 is disposed facing the shaft compartment 1402 formed by the gearbox cover 14. The pair of opposed ears 1603 on the bushing ring 16 disposed under the gear 18 is received in the ear holders 2005 of the gearbox base 20 and affixed thereby. Hence, the bushing rings 16 are not rotating while the gear 18 and the spiral blade 12 are driven by the driving shaft 102.

Referring to the FIGS. 17-20, the gear 18 is illustrated as a rotatable element having a gear plate 1810, two gear holding openings 1802 and 1803 in the gear plate 1810, a gear peripheral wall 1806 extending upwardly and downwardly from the circumference of the gear plate 1810. A gear central opening 1805 locates in the center of the gear plate 1810. The gear plate 1810 is further divided into two parts by a gear gap 1801. When a spiral blade 12 is disposed on top of the gear 18 and the two mating key rings 1204 and 1205 are matched into the gear holding opening 1802 and 1803, the gear gap 1801 is matched vertically in the same position with the blade 1201. While the gear 18 and the spiral blade 12 are rotated simultaneously by the driving shaft 102, the blade 1201 and the gear gap 1801 maintain the relative same position. Thereby, the food sliced by the blade 1201 pass through the gear gap 1801 and drop into the work bowl 100.

The gear teeth 1820 locate outside of the gear peripheral wall 1806 and extend outwardly therefrom. The gear teeth 1820 are complimentary keyed to mate with the teeth on the upper end 104 of the driving shaft 102. Hence, when the driving shaft 102 is driven by the motor and rotates, the gear 18 is driven by the driving shaft 102 via the engagement between the gear teeth 1820 and the teeth on the upper end 104 of the driving shaft 102.

Figure 21:
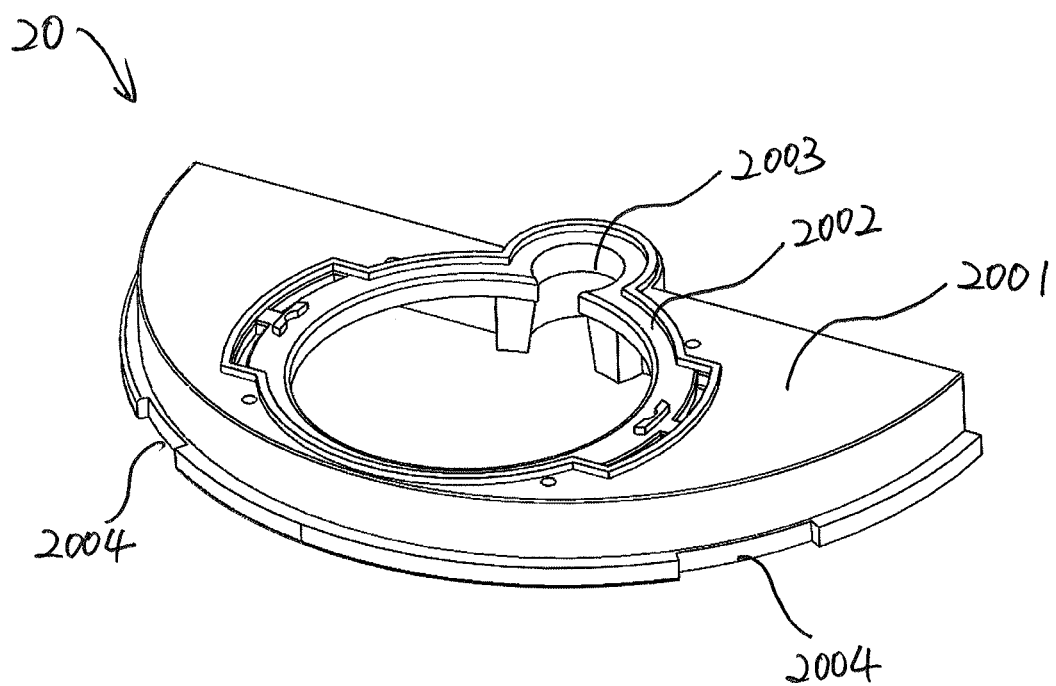
FIG. 21 is an isometric view of a gearbox base in accordance with an embodiment of the present invention.
Figure 22:
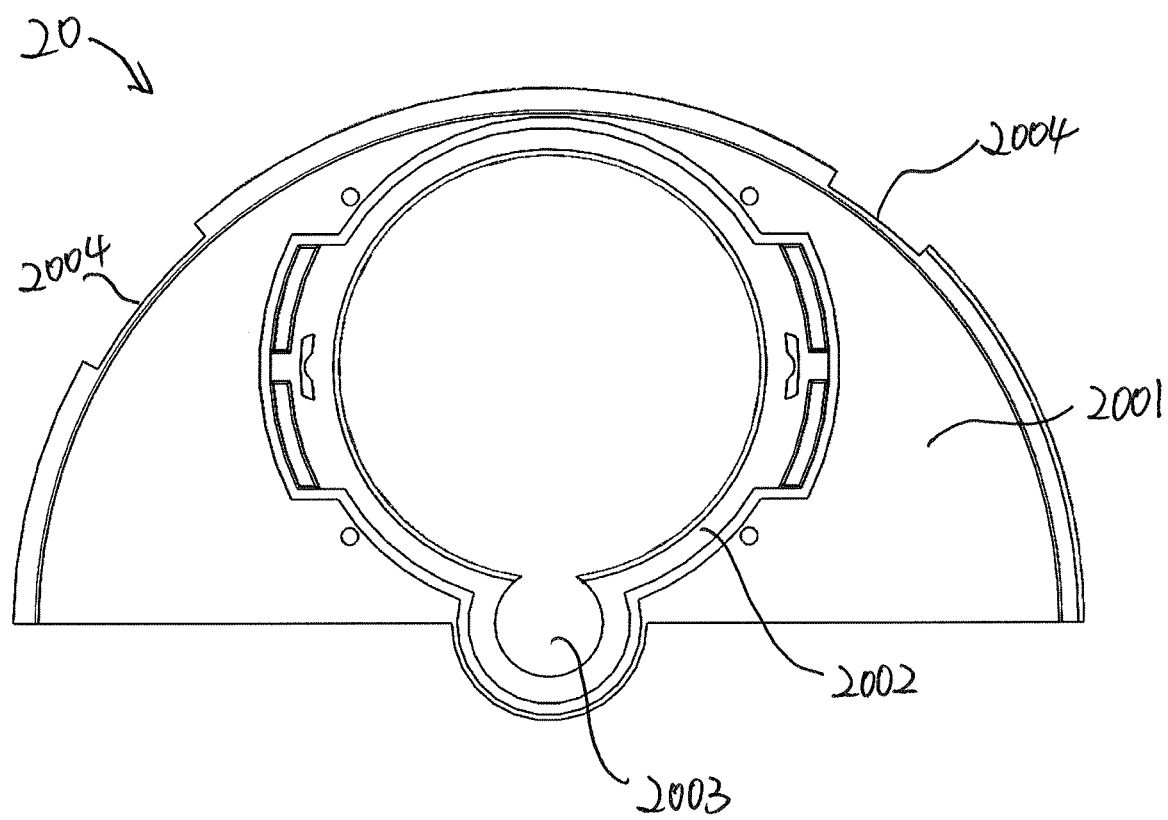
FIG. 22 is a top elevational view of a gearbox base in accordance with an embodiment of the present invention.
Figure 23:
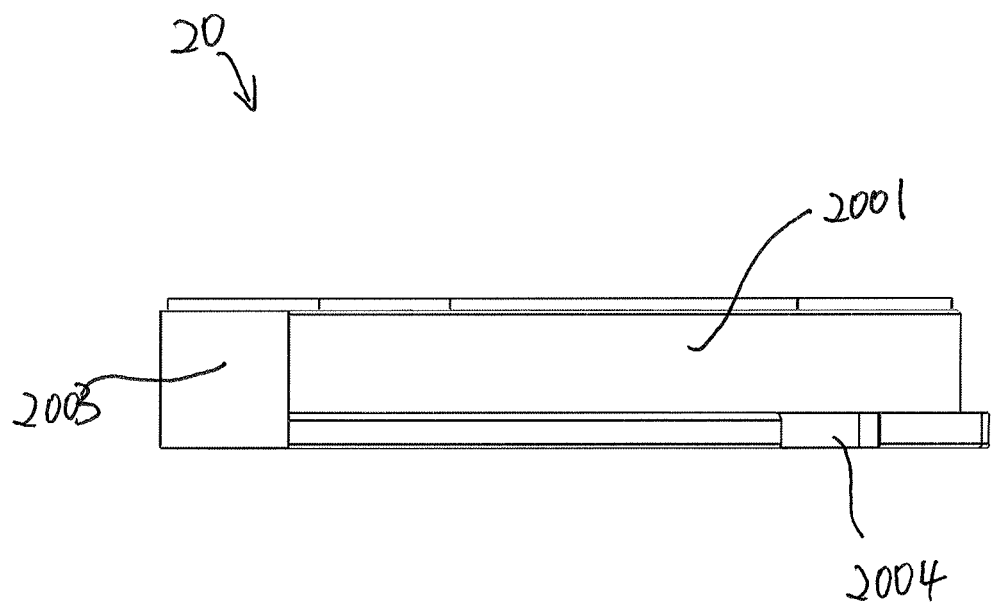
FIG. 23 is a side elevational view of a gearbox base in accordance with an embodiment of the present invention.

FIGS. 21-23 illustrate the gearbox base 20. The gearbox base 20 has a base frame 2001. The gearbox cover 14 is affixed to the gearbox base 20 by fasteners generally known in the art. In one embodiment, four screws penetrate through the gearbox base 20 and is received by the fasteners receiver 1404 in the gearbox cover. A base opening 2006 locates in the base frame. The base opening 2006 includes two compartments: the gear opening 2002 and the shaft opening 2002. By arranging the gearbox cover 14 on top of the gearbox base 20, the gear opening 2002 matches with the gear compartment 1403 of the gearbox cover 14 and forms a gear housing 110 as shown in FIG. 6 for enclosing the gear 18, while the shaft opening 2003 matches with the shaft compartment 1402 forming an engagement housing 108 as shown in FIG. 6 and permits the driving shaft 102 extending through the shaft opening 2003 to engage with the gear teeth 1820 in the engagement housing 108.

The gearbox base 20 further includes a pair of keyways 2005 which receives the opposed pair of ears 1603 on the bushing rings 16. The engagement between the pair of ear holders 2005 and the opposed pair of ears 1603 holds the bushing rings 16 in its place and remain stable while the gear 18 and the spiral blade 12 are rotated by the driving shaft 102. More than one keyways 2004 are embedded on the gear base frame 2001. The keyways 2004 are complimentary mated with the snapping means 106 on the inner wall of the lip of the work bowl 100. In one embodiment, as reflected in FIG. 21, the gearbox base is in a semicircular shape. Two keyways 2004 are embedded on the gear base frame 2001. The two keyways 2004 are arranged in a manner that they can be matched with and locked onto any two adjacent snapping means 106 on the lip of the work bowl 100, and thereby permits the gearbox base 20 to be disposed onto the work bowl in four different positions. It shall be noted that the snapping means and the keyways can be arranged in various numbers and positions, as long as the snapping means and the keyways can be mated with each other for disposing the gearbox base onto the work bowl 100.

During its operation, the slicing disc assembly 10 is disposed onto the work bowl 100 via the engagement between the snapping means 106 on the work bowl and the keyways 2004 on the gearbox base 20. The driving shaft 102 standing upwardly from the bottom of the work bowl 100 extends into the engagement housing 108, where the teeth on the upper end 104 of the driving shaft 102 are complimentary mated with the gear teeth 1820. Therefore, when the motor drives the driving shaft 102 into rotation, the upper end 104 of the driving shaft 102 drives the gear 18 in the gear housing 110 planetarily via engagement between the teeth on the upper end 104 and the gear teeth 1820.

The rotation of the gear 18 further drives the spiral blade 12 disposed on top of the gear 18 rotating via the engagement between the mating key rings 1204 and 1205 of the spiral blade 12 and the gear holding rings 1802 and 1803 of the gear 18. This engagement permits the spiral blade 12 and the gear 18 to rotate simultaneously, and are synchronized to rotate at the same speed in the same direction. More importantly, this synchronized rotation maintains the blade 1201 of the spiral blade 12 and the gear gap 1801 of the gear 18 to be in the same relative position during the rotation of the spiral blade 12 and the gear 18, and thereby ensures that the food sliced by the blade 1201 would pass through the gear gap 1801 and collected by the work bowl 100.

The blade holding openings 1202 and 1203 on the spiral blade 12 permits the user to handle the spiral blade 12 for installing, removing and replacing without touching the blade 1201 itself, thereby enhancing the safety of the slicing disc assembly 10 as a whole by preventing the direct touching of the blade by the user.

Although this invention has been shown and described with respect to the detailed embodiments thereof, it will be understood by those of skill in the art that various changes may be made and equivalents may be substituted for elements thereof without departing from the scope of the invention. In addition, modifications may be made to adapt a particular situation or material to the teachings of the invention without departing from the essential scope thereof. Therefore, it is intended that the invention not be limited to the particular embodiments disclosed in the above detailed description, but that the invention will include all embodiments falling within the scope of this disclosure.

What is claimed is:

1. A food processing apparatus, comprising:
   a housing for accommodating a motor;
   a work bowl mounted to said housing;
   a drive shaft in operable communication with said motor and extending into said work bowl, said drive shaft selectively rotating when said motor is operated;
   a gear, said gear being selectively positioned about a perimeter of said work bowl in operable communication with said drive shaft;
   a cutting disc having a blade, said cutting disc being removably engaged with said gear such that rotation of said drive shaft via said motor causes said gear to rotate said cutting disc and said blade; and
   wherein said cutting disc defines a disc opening, said disc opening permitting manual manipulation of said cutting disc to facilitate a selective disengagement of said cutting disc from said gear.

2. The food processing apparatus according to claim 1, wherein:
   said gear includes a gear body having a gear opening, said gear opening permitting manual manipulation of said gear to facilitate a selective disengagement of said gear from said drive shaft.

3. The food processing apparatus according to claim 1, wherein:
   said perimeter of said work bowl defines a plurality of attachment means, whereby said gear may be selectively affixed to one of said plurality of attachment means to selectively locate said gear at one of a plurality of different positions about said perimeter of said work bowl.

4. The food processing apparatus according to claim 2, wherein:
   said gear body further defines a gap; and
   wherein an orientation between said blade and said gap is maintained during rotation of said drive shaft, when said cutting disc and said gear are in operable communication with said drive shaft as said motor is operated.

5. The food processing apparatus according to claim 2, wherein:
   said gear body defines a gear opening; and
   wherein an orientation between said gear opening and said disc opening is maintained during rotation of said drive shaft, when said cutting disc and said gear are in operable communication with said drive shaft as said motor is operated.

6. A food processing apparatus, comprising:
   a housing for accommodating a motor;
   a work bowl mounted to said housing;
   a drive shaft in operable communication with said motor and extending into said work bowl, said drive shaft selectively rotating when said motor is operated;
   a gear, said gear being selectively positioned about a perimeter of said work bowl in operable communication with said drive shaft;
   a cutting disc having a blade, said cutting disc being removably engaged with said gear such that rotation of said drive shaft via said motor causes said gear to rotate said cutting disc and said blade; and
   said perimeter of said work bowl defines a plurality of attachment means, whereby said gear may be selectively affixed to one of said plurality of attachment means to selectively locate said gear at one of a plurality of different positions about said perimeter of said work bowl.

7. The food processing apparatus according to claim 6, wherein:
   said cutting disc defines a disc opening, said disc opening permitting manual manipulation of said cutting disc to facilitate a selective disengagement of said cutting disc from said gear.

8. The food processing apparatus according to claim 6, wherein:
   said gear body defines a gear opening; and
   wherein an orientation between said gear opening and said disc opening is maintained during rotation of said drive shaft, when said cutting disc and said gear are in operable communication with said drive shaft as said motor is operated.

9. The food processing apparatus according to claim 6, wherein:
   said gear body further defines a gap; and
   wherein an orientation between said blade and said gap is maintained during rotation of said drive shaft, when said cutting disc and said gear are in operable communication with said drive shaft as said motor is operated.

* * * * *